Nov. 1, 1955
D. J. SIKORRA
2,722,654
REGULATING SYSTEM UTILIZING A SATURABLE
REACTOR HAVING NEGATIVE FEEDBACK
Filed Dec. 11, 1950
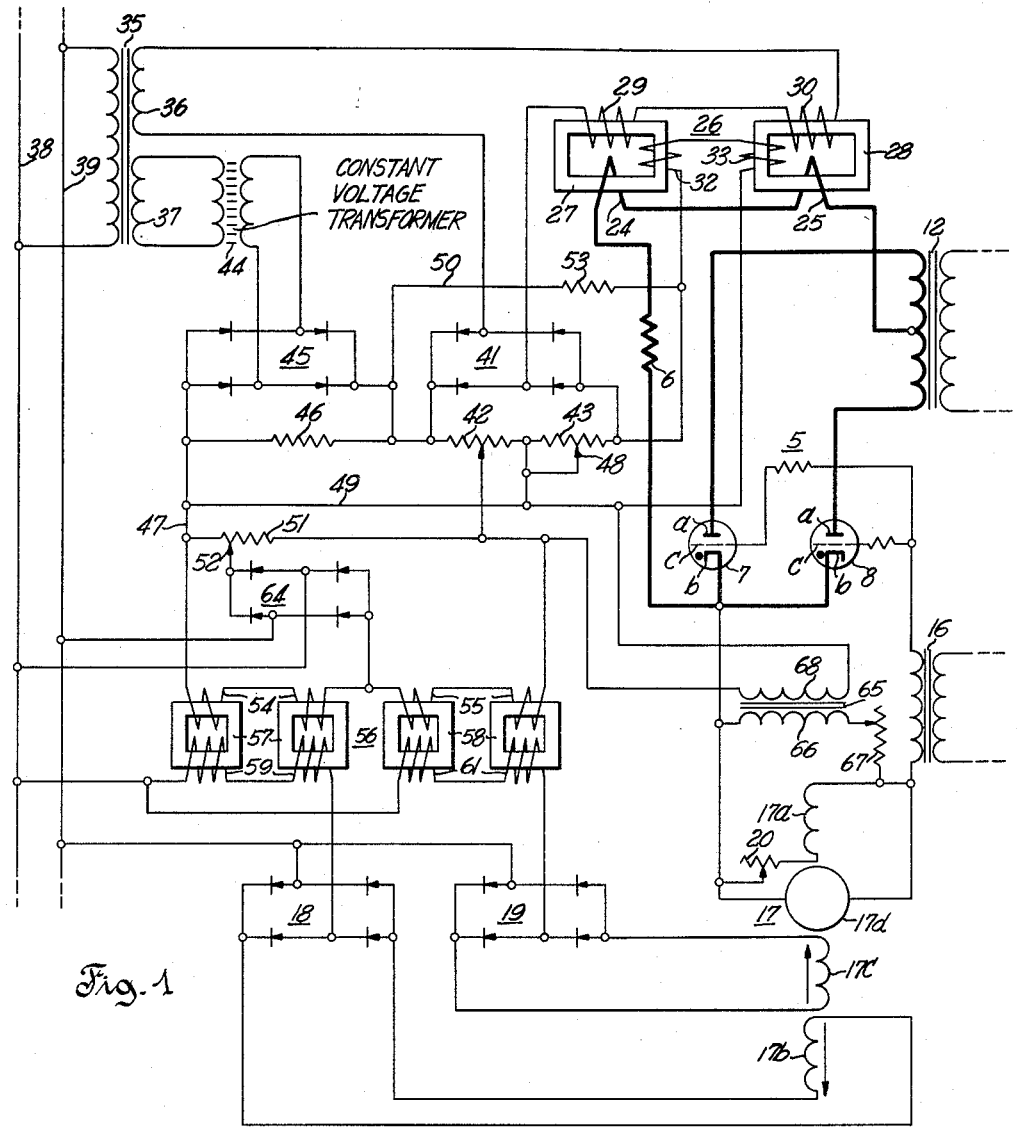
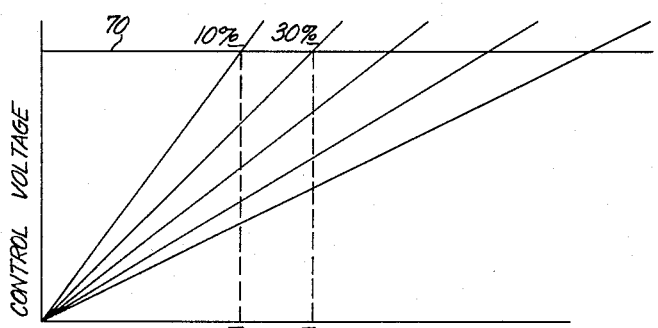
Inventor
Daniel J. Sikorra
Walter J. Madden, Jr.
by
Attorney

United States Patent Office

2,722,654
Patented Nov. 1, 1955

2,722,654

REGULATING SYSTEM UTILIZING A SATURABLE REACTOR HAVING NEGATIVE FEEDBACK

Daniel J. Sikorra, Milwaukee, Wis., assignor to Allis-Chalmers Manufacturing Company, Milwaukee, Wis.

Application December 11, 1950, Serial No. 200,139

4 Claims. (Cl. 323—1)

This invention relates in general to regulating systems and in particular to regulating systems utilizing saturable reactors.

In the regulation of electric quantities, it is known to provide a saturable reactor having a saturating or control winding traversed by a measure of the quantity to be regulated and to utilize the current flowing in the inductive or reactance winding of the reactor as a measure of the value of the regulated quantity. However, where the desired value of the regulated quantity is varied between wide limits, the resultant wide variations in the current in the inductive winding necessitate the use of large capacity equipment to handle these wide current variations and the resultant wide variations in the flux density in the reactor core produce varying regulator sensitivities at varying values of the regulated quantity.

These disadvantages can be overcome by providing the reactor with feedback connections whereby variations in the magnetomotive force of the saturating winding are counteracted to a predetermined adjustable extent by the feedback magnetomotive force. For a wide range of desired values of the regulated quantity the current in the inductive winding is substantially constant and the reactor core operates at substantially constant flux density. This permits the use of small capacity circuit components in the inductive winding circuit for large values of the regulated quantity and results in substantially uniform sensitivity of the regulator for varying values of the regulated quantity.

It is therefore an object of this invention to provide a regulating system utilizing a saturable reactor in which the magnitude of the current traversing the inductive winding of the reactor undergoes small variations in response to wide variations in the magnitude of the current traversing the saturating windings of the reactor.

It is a further object of the present invention to provide a regulating system utilizing a saturable reactor having negative feedback connections to cause the current in the reactor inductive winding to undergo small changes in magnitude in response to wide variations in the magnitude of the current traversing the saturating winding of the reactor.

It is an additional object of the present invention to provide a regulating system utilizing a saturable reactor having a saturating winding traversed by a measure of the regulated quantity, in which the flux density in the reactor core is substantially constant for all values of the regulated quantity.

Objects and advantages other than those outlined above will be readily apparent from the following detailed description when read in connection with the accompanying drawing, in which:

Fig. 1 diagrammatically illustrates one embodiment of the present invention applied to the regulation of the direct current output of a rectifier, and Fig. 2 is a graph illustrating the operation of the regulating system illustrated in Fig. 1.

Referring to Fig. 1, one embodiment of the invention is shown applied to the regulation of the current supplied by a full wave rectifier 5 to a load device 6. Rectifier 5 may be of any suitable known type, such as a pair of thyratrons 7, 8 provided with anodes 7a, 8a, cathodes 7b, 8b and control grids 7c, 8c. The plate circuits of tubes 7, 8 may be energized from a suitable alternating current source, such as the center tapped secondary winding of a transformer 12. The voltage for grids 7c, 8c may consist of an alternating voltage component of suitable phase with respect to the voltage of transformer 12 supplied by a transformer 16, and a variable negative unidirectional voltage component supplied from a suitable controllable source, such as an exciter generator 17. Exciter 17 is provided with a self-exciting field winding 17a connected in series with an adjustable resistor 20 across the terminals of armature 17d, and a pair of differentially acting field windings 17b, 17c, energized through full wave rectifiers 18, 19 respectively.

Connected in series with rectifier 5 and load 6 are two saturating windings 24, 25 of a saturable reactor 26. Reactor 26 is also provided with a pair of saturable cores 27, 28, a pair of inductive windings 29, 30, and a pair of feedback windings 32, 33. Saturating windings 24, 25 may comprise any desired number of turns and if the current supplied by rectifier 5 is of sufficient magnitude, windings 24, 25 may consist of a length of conductor extending through the windows of cores 27, 28. Inductive windings 29, 30 are supplied from the secondary winding 36 of a transformer 35 energized from a source of alternating current represented by conductors 38, 39. Variations in the net magnetomotive force of windings 24, 25, 32, 33 act in a well known manner to vary the current in inductive windings 29, 30.

A full wave rectifier 41 connected between secondary winding 36 and inductive windings 29, 30 impresses on a pair of resistors 42, 43 a control voltage varying in response to variations in the net magnetomotive force of windings 24, 25, 32, 33. The control voltage of resistors 42, 43 or a portion thereof, such as the voltage of the adjustable portion of resistor 42, is compared with a suitable reference quantity, such as a substantially constant voltage obtained from a constant voltage transformer 44 energized by secondary winding 37 of transformer 35. The output of transformer 44 is impressed on a rectifier 45 which has a resistor 46 connected across its direct current terminals. One terminal of resistor 46 is connected to a terminal of like polarity of resistor 42, so that the voltage appearing between conductor 47 and the adjustable tap of resistor 42 is a second control voltage equal to the difference between the constant voltage of resistor 46 and the control voltage of the adjustable portion of resistor 42.

A unidirectional voltage proportional to the control voltage of resistor 42, such as the voltage across an adjustable portion of resistor 43, is supplied to feedback windings 32, 33 in a direction to oppose the saturation of cores 27, 28 by windings 24, 25. An adjustable tap 48 on resistor 43 provides means for varying the value of the negative feedback voltage supplied to feedback windings 32, 33. Windings 32, 33 may also be supplied with a substantially constant unidirectional stabilizing voltage from rectifier 45 through conductors 49, 50 and a resistor 53, of a polarity to oppose the voltage of resistor 43.

The control voltage appearing between conductor 47 and the adjustable tap of resistor 42 has a polarity and magnitude dependent upon the direction and magnitude of variations in the current traversing windings 24, 25 from a predetermined value and is impressed upon a resistor 51 provided with an adjustable tap 52. Connected across resistor 51 are the control windings 54, 55 of a balanced magnetic amplifier 56. Amplifier 56 is also provided with saturable cores 57, 58 and reactance windings 59, 61. In addition to the second control voltage, windings 54, 55 have impressed thereon a substantially constant unidirectional voltage obtained from a suitable source, such as a full wave rectifier 64 energized from conductors 38, 39. One direct current terminal of rectifier 64 is connected to tap 52 of resistor 51, while the other direct current rectifier terminal is connected between windings 54, 55. Reactance windings 59, 61 are energized in parallel from conductors 38, 39 through rectifiers 18, 19 and field windings 17b, 17c respectively, to produce variations in the voltages impressed upon field windings 17b, 17c in response to variations in the reactances of windings 59, 61.

To prevent hunting, the system may be provided with a damping transformer 65 having a primary winding 66 connected across armature 17d in series with an adjustable resistor 67, and a secondary winding 68 connected across windings 54, 55.

In operation of the system, with exciter 17 operating, rectifier 5 supplies to load 6 a current determined by the voltage impressed on grids 7c, 8c by exciter 17. Assuming that rectifier 5 is supplying the predetermined desired value of current to load 6, adjustable tap 48 of resistor 43 is adjusted so that the magnetomotive force of windings 32, 33 counteracts the magnetomotive force of windings 24, 25 to an extent sufficient to produce in inductive windings 29, 30 a predetermined current. This predetermined current in windings 29, 30 produces a predetermined voltage across the direct current terminals of rectifier 41 and resistors 42, 43. The adjustable tap of resistor 42 is preferably adjusted so that the voltage of the adjustable portion of resistor 42 is equal to the voltage of resistor 46, and therefore no voltage is impressed on resistor 51 by resistors 42, 46. Under these conditions, the only current in control windings 54, 55 of amplifier 56 is that supplied by rectifier 64. The current from rectifier 64 biases cores 57, 58 to predetermined degrees of saturation, and causes the voltages of rectifiers 18, 19 to have predetermined values. If resistor 20 is adjusted so that self-exciting field winding 17a provides all the excitation required to maintain the voltage of armature 17d at any given value, the net magnetomotive force of field windings 17b, 17c is zero when armature 17d is supplying to grids 7c, 8c a voltage sufficient to maintain the current in load device 6 at the predetermined desired value. Assuming that field windings 17b, 17c contain equal numbers of turns, rectifiers 18, 19 should therefore supply equal currents to field windings 17b, 17c when the load current has the desired value. Under these conditions, tap 52 of resistor 51 is adjusted so that rectifier 64 supplies equal currents to windings 54, 55 to produce equal reactances in windings 59, 61. Self-exciting winding 17a then supplies all of the excitation of exciter 17 to cause the exciter to furnish to grids 7c, 8c a unidirectional voltage component sufficient to maintain the output current of rectifier 5 at its predetermined desired value. However, it will be appreciated that if it is desired that one of the field windings supplied through windings 59, 61 be energized differently than the other, adjustable tap 52 of resistor 51 may be moved to vary the ratio of the currents supplied to windings 54, 55 to thereby vary the ratio of the reactances of windings 59, 61.

If the load current increases above the desired value, the magnetomotive force of windings 24, 25 increases to increase the saturation of cores 27, 28, thereby increasing the voltage impressed on rectifier 41 through windings 29, 30 and thereby increasing the voltage across resistors 42, 43. An increase in the voltage of the adjustable portion of resistor 42 above the voltage of resistor 46 impresses on control winding 55 a control voltage opposing the voltage supplied by rectifier 64 to winding 55, and impresses on control winding 54 a control voltage aiding the voltage supplied winding 54 by rectifier 64. This causes the saturations of cores 57, 58 to vary oppositely, decreasing the reactance of winding 59 and increasing the reactance of winding 61. This action causes the voltage of rectifier 18 to exceed the voltage of rectifier 19 and produces in field winding 17b a magnetomotive force greater than the magnetomotive force of winding 17c. The magnetomotive force of winding 17b is in a direction to increase the armature voltage of exciter 17 and thereby increase the negative unidirectional potential component of grids 7c, 8c to reduce the current supplied by rectifier 5 to substantially the predetermined desired value.

If the current supplied by rectifier 5 decreases below the predetermined desired value, the action of the regulating means to increase the current to substantially its desired value is the reverse of that described below.

The action of feedback windings 32, 33 can readily be understood by reference to the graphs of Fig. 2, in which the control voltage impressed upon the adjustable portion of resistor 42 through windings 29, 30 is plotted as a function of the load current of rectifier 5 for varying settings of the adjustable tap 48 of resistor 43. The horizontal line 70 in Fig. 2 represents the constant voltage of resistor 46. The ordinate axis of Fig. 2 could represent the total voltage of rectifier 41 instead of the voltage of the adjustable portion of resistor 42, since these two voltages are directly proportional, but for convenience in showing the relation between the voltages of resistors 42, 46 the voltage of the adjustable portion of resistor 42 is utilized as a reference.

The various curves of Fig. 2 are labeled in terms of percentage, representing the percentage ratio between the magnetomotive force of feedback windings 32, 33 and the magnetomotive force of saturating windings 24, 25, for varying settings of tap 48. When the magnetomotive force of windings 32, 33 is 10 percent of the magnetomotive force of windings 24, 25, the voltage of the adjustable portion of resistor 42 will equal the voltage of resistor 46 when the load current has a value of $I_1$, and the system will therefore regulate to maintain constant the current $I_1$, in the load circuit.

If it is desired to increase the load current, adjustable tap 48 of resistor 43 is moved to increase the current through windings 32, 33 to thereby increase the percentage of negative feedback to, say, 30 percent. Fig. 2 shows that for 30 percent negative feedback, the voltages of resistors 42, 46 will be equal when the load current has the value $I_2$, and the system will therefore regulate to maintain current $I_2$ constant.

Thus it will be seen that the system may be made to regulate for any desired value of load current by adjusting tap 48 to vary the current through feedback windings 32, 33. It will also be noted that although the current in saturating windings 24, 25 varies within wide limits for varying settings of tap 48, the net magnetomotive force of windings 24, 25, 32, 33 remains substantially constant when the load current has its predetermined desired value. This results in a substantially constant current traversing windings 29, 30 and rectifier 41 for varying values of load current and produces a substantially constant flux density in the reactor cores, thereby considerably reducing the magnitude of the current in rectifier 41 with respect to its value if windings 32, 33 were not used, permitting the use of small components to regulate large load currents and producing substantially uniform sensitivity of the regulating means.

It has been found that the operation of reactor 26 with high values of negative feedback is rendered more stable by supplying to windings 32, 33 the constant stabilizing voltage from rectifier 45 in a direction to oppose the voltage of resistor 43, although the use of such stabilizing component is not essential to the operation of the system. It will be understood that although the saturable reactors tuilized in this invention have been shown comprising two cores, reactors comprising conventional three-legged cores would be equally effective.

Although but one embodiment of this invention has been shown and described, it is understood that various changes and modifications can be made therein without departing from the spirit of this invention or from the scope of the appended claims.

It is claimed and desired to secure by Letters Patent:

1. In a regulating system for maintaining a quantity substantially constant at any selected value within a predetermined range, the combination of a saturable reactor having an inductive winding, a saturating winding and a feedback winding, a source of alternating current for energizing said inductive winding, means connected in circuit with said inductive winding and said source for producing a control voltage having a magnitude dependent upon the net magnetomotive force of said saturating and feedback windings, means connecting said saturating winding to be energized with a measure of said quantity for producing a saturating magnetomotive force in the direction to saturate said reactor, means connecting said feedback winding to be energized in proportion to said control voltage for producing a feedback magnetomotive force in the direction to desaturate said reactor, a source of substantially constant voltage, adjusting means for varying the magnitude of said feedback voltage to select from said range any value at which to maintain said quantity constant, and regulating means responsive to the difference between said control voltage and said constant voltage for controlling said quantity to maintain said quantity substantially constant at any selected value and to cause said saturating and feedback windings to maintain said net magnetomotive force at substantially the same constant magnitude for all selected values of said quantity within said range.

2. In a regulating system for maintaining a quantity substantially constant at any selected value within a predetermined range, the combination of a saturable reactor having an inductive winding, a saturating winding and a feedback winding, a source of alternating current for energizing said inductive winding, means connected in circuit with said inductive winding and said source for producing a control voltage having a magnitude dependent upon the net magnetomotive force of said saturating and feedback windings, means connecting said saturating winding to be energized with a measure of said quantity for producing a saturating magnetomotive force in the direction to saturate said reactor, means connecting said feedback winding to be energized in proportion to said control voltage for producing a feedback magnetomotive force in the direction to desaturate said reactor, a source of substantially constant voltage, adjusting means for varying the magnitude of said feedback voltage to select from said range any value at which to maintain said quantity constant, and regulating means responsive to the difference between said control voltage and said constant voltage for controlling said quantity to maintain said quantity substantially constant at any selected value and to maintain said net magnetomotive force at substantially the same constant magnitude for all selected values of said quantity within said range.

3. In a regulating system for maintaining a quantity substantially constant at any selected value within a predetermined range, the combination of a saturable reactor having two cores and each of said cores having an inductive winding, a saturating winding and a feedback winding thereon, a source of alternating current for energizing said inductive windings, a full wave rectifier connected in circuit with said inductive windings and said source for producing a control voltage having a magnitude dependent upon the net magnetomotive force of said saturating and feedback windings, means connecting said saturating windings to be energized with a measure of said quantity for producing a saturating magnetomotive force in the direction to saturate said reactor, means connecting said feedback windings to be energized in proportion to said control voltage for producing a feedback magnetomotive force in the direction to desaturate said reactor, a source of substantially constant voltage, adjusting means for varying the magnitude of said feedback voltage to select from said range any value at which to maintain said quantity constant and regulating means responsive to the difference between said control voltage and said constant voltage for controlling said quantity to maintain said quantity substantially constant at any selected value and to cause said saturating and feedback windings to maintain said net magnetomotive force at substantially the same constant magnitude for all selected values of said quantity within said range.

4. In a regulating system for maintaining a quantity substantially constant at any selected value within a predetermined range, the combination of a saturable reactor having an inductive winding, a saturating winding and a feedback winding, a source of alternating current for energizing said inductive winding, means connected in circuit with said inductive winding and said source for producing a control voltage having a magnitude dependent upon the net magnetomotive force of said saturating and feedback windings, means connecting said saturating winding to be energized with a measure of said quantity for producing a saturating magnetomotive force in the direction to saturate said reactor, means connecting said feedback winding in proportion to said control voltage for producing a feedback magnetomotive force in the direction to desaturate said reactor, means for impressing a substantially constant stabilizing voltage on said feedback winding to produce a stabilizing magnetomotive force in the direction to oppose said feedback magnetomotive force, a source of substantially constant voltage, adjusting means for varying the magnitude of said feedback voltage to select from said range any value at which to maintain said quantity constant and regulating means responsive to the difference between said control voltage and said constant voltage for controlling said quantity to maintain said quantity substantially constant at any selected value and to cause said saturating and feedback windings to maintain said net magnetomotive force at substantially the same constant magnitude for all selected values of said quantity within said range.

References Cited in the file of this patent

UNITED STATES PATENTS

| | | |
|---|---|---|
| 2,477,990 | Lamn | Aug. 2, 1949 |
| 2,504,675 | Forssell | Apr. 18, 1950 |

FOREIGN PATENTS

| | | |
|---|---|---|
| 442,883 | Great Britain | Feb. 17, 1936 |
| 446,790 | Great Britain | May 6, 1936 |